Oct. 3, 1961 F. H. GARDNER 3,002,382
STATIC PRESSURE ERROR COMPENSATOR
Filed Aug. 16, 1955 6 Sheets-Sheet 3

INVENTOR.
FREDERICK H. GARDNER
BY
William R Lane
ATTORNEY

Oct. 3, 1961 F. H. GARDNER 3,002,382
STATIC PRESSURE ERROR COMPENSATOR
Filed Aug. 16, 1955 6 Sheets-Sheet 4

INVENTOR.
FREDERICK H. GARDNER
BY
William L. Lane
ATTORNEY

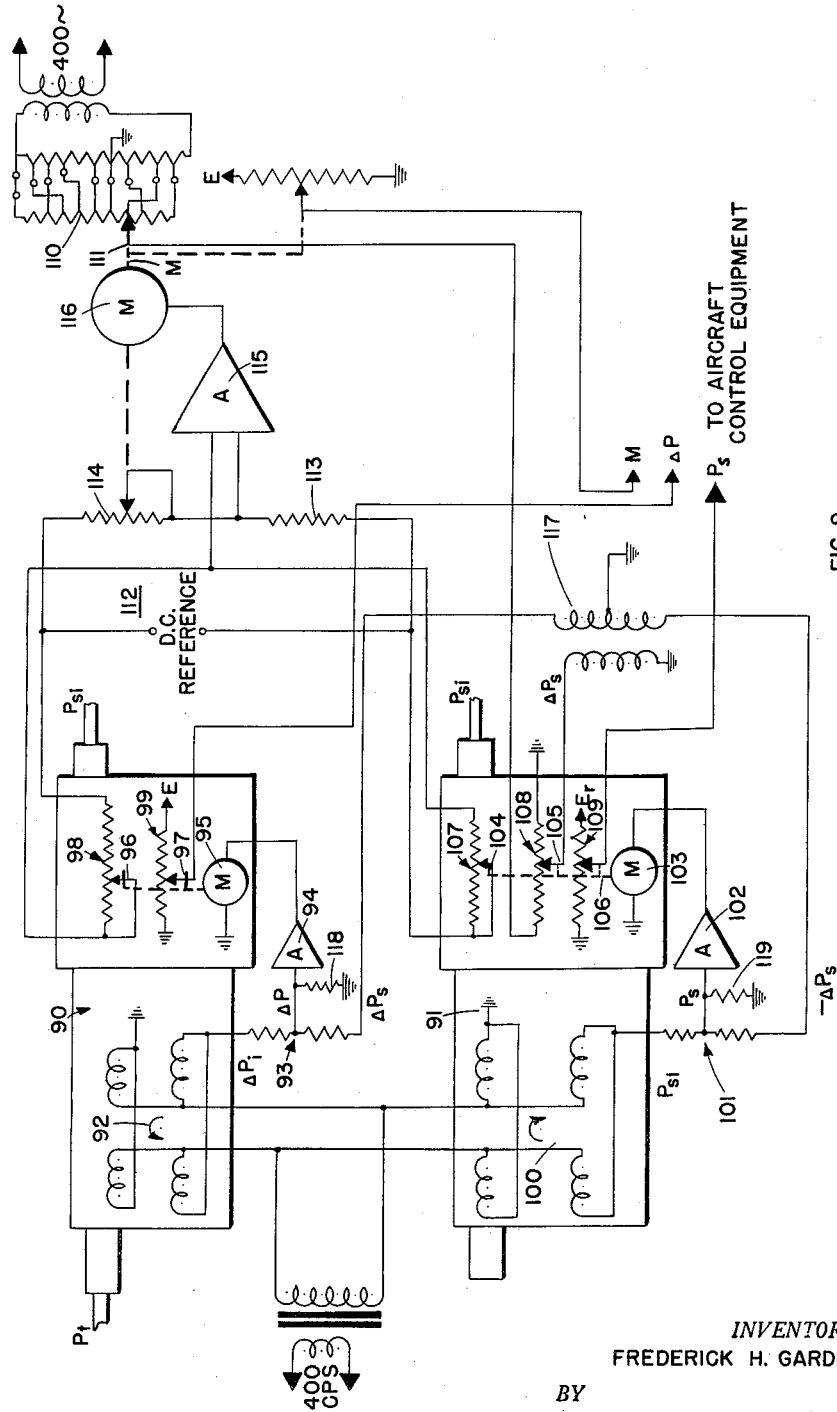

United States Patent Office 3,002,382
Patented Oct. 3, 1961

3,002,382
STATIC PRESSURE ERROR COMPENSATOR
Frederick H. Gardner, Long Beach, Calif., assignor to North American Aviation Inc.
Filed Aug. 16, 1955, Ser. No. 528,848
10 Claims. (Cl. 73—182)

This invention relates to static pressure error compensators and particularly to an apparatus for producing an accurate indication of the true free-stream static air pressure in high speed aircraft.

To provide improved flight data information in high speed aircraft it is necessary to eliminate by some means the error in the static pressure data obtained from the pressure ports of conventional static pressure detectors. These errors are predominantly due to shock waves and misalignment of the pitot mast with the average velocity vector. In the past a long nose boom has been employed in high speed aircraft to place the static pressure source far ahead of the main shock wave. This does not provide complete relief because of the local shock wave from the nose boom itself.

It is therefore an object of this invention to provide an improved apparatus for producing an accurate indication of the true free-stream static pressure in a high speed aircraft.

It is another object of this invention to provide an apparatus for introducing compensation into a static pressure line to effectively cancel the errors in said line caused by shock waves and misalignment of the static pressure source.

It is a further object of this invention to provide a static pressure error compensator for high speed aircraft including a source of indicated static air pressure and total air pressure, computer means responsive to said pressures and having an output signal which is a predetermined function of the static pressure error, and means responsive to the output of said computer means for converting indicated static pressure into true free-stream static pressure.

It is another object of this invention to provide a static pressure error compensator for high speed aircraft including a computer responsive to total pressure and static pressure for producing an output which is a predetermined function of the static pressure error and pressure compensator means adapted to convert indicated static pressure into true free-stream static pressure in response to the output of said computer means.

Other objects of invention will become apparent from the following description taken in connection with the accompanying drawings, in which FIG. 1 is a graphic plot of the ratio of a static pressure error, $\Delta P_s$, to the indicated dynamic pressure differential, $\Delta P_i$, as a function of the indicated Mach number, $M_i$, for a typical wing-type pitot static head;

And FIG. 9 is a schematic drawing of an alternative embodiment of the static pressure error compensator contemplated by this invention.

Figure 1:
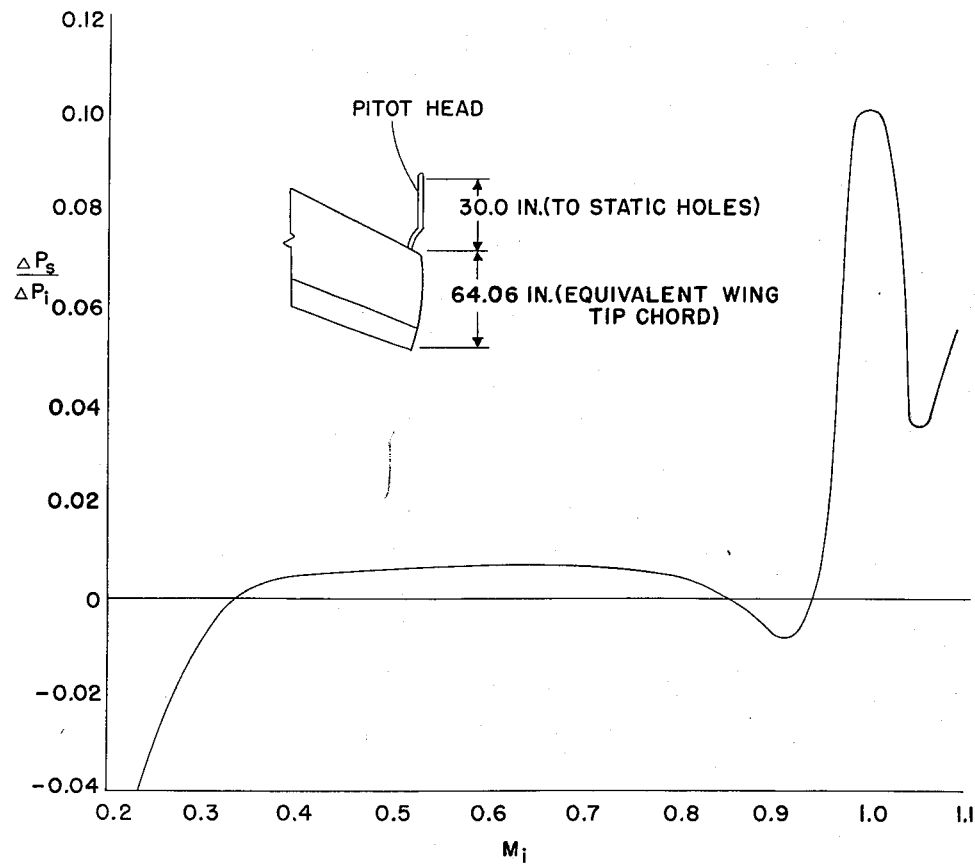

Utilizing experimental data with respect to any particular aircraft and any particular positioning of the pressure ports in the aircraft, it is possible to accurately plot the ratio of static pressure error, $\Delta P_s$, to indicated dynamic pressure differential, $\Delta P_i$, as a function of the indicated flight Mach number, $M_i$. A typical curve of this function is shown in FIG. 1 for a representative source of static and total pressures. In this example, a short wing-tip pitot static head, with the static holes approximately 30 inches in front of the leading edge of the wing was utilized. The data, which was utilized to produce this plot, was obtained partially from flight tests and partially from an experimental data resulting from high speed flight tests on a research aircraft and from wind tunnel data. The procedures used to obtain the data are well-known to those skilled in the art and need not be further described here.

As has been previously pointed out, the indicated static pressure detected by the pressure ports of conventional static pressure detectors is an inaccurate indication of the true free-stream static pressure, particularly at supersonic speeds. This indicated static pressure, $P_{si}$, detected by the static pressure detector differs from the true free-stream static pressure, $P_s$, by the static pressure error, $\Delta P_s$. It has been found that the static pressure error, $\Delta P_s$, can be accurately computed by utilizing proper functions of either the indicated static pressure, $P_{si}$, or true static pressure, $P_s$, and either true flight Mach number, M, or indicated flight Mach number, $M_i$. The flight Mach number, either true or indicated, may be accurately obtained by combining functions of the static and total pressures. Thus, the static pressure error, $\Delta P_s$, is some predeterminable function of the static and total pressures.

The apparatus of this invention utilizes a computer to accurately produce, in response to total and static pressures, an output signal which is a predetermined function of the static pressure error, $\Delta P_s$, and utilizes this output to produce an accurate indication of the true free-stream static pressure, $P_s$.

The following is a mathematical analysis of the computer, utilized by the preferred embodiment of this invention to produce a signal output which is a predetermined function of the static pressure error, $\Delta P_s$. It will be readily apparent that it is not critical whether the basic parameters are true or indicated values. In this analysis $\Delta P_s$ is the error in static pressure, $\Delta P_i$ is the indicated dynamic pressure differential, $P_{si}$ is the indicated static pressure, $P_s$ is the true free-stream static pressure, $P_t$ is the total pressure, $M_i$ is the indicated Mach number, M is the true flight Mach number, $\Delta M$ is the difference between true Mach number and indicated Mach number, and $\Delta P$ is the true dynamic pressure differential. It is assumed that the total pressure source is without appreciable error. This assumption is readily obtainable by means well-known to those skilled in the art.

From the foregoing definition of the terms, the following identities can be obtained:

$$\Delta P_s = P_{si} - P_s \quad (1)$$
$$\Delta P_i = P_t - P_{si} \quad (2)$$

and $$\Delta P = P_t - P_s \quad (3)$$

Referring to FIG. 1, which is a plot of $\Delta P_s/\Delta P_i$ as a function of $M_i$, it is possible to express this curve mathematically as:

$$\frac{\Delta P_s}{\Delta P_i} = f_1(M_i) \quad (4)$$

where $f_1(M_i)$ is a functional expression of indicated flight Mach number which satisfies the curve of FIG. 1. From Equations 1, 2 and 3:

$$\Delta P_i = \Delta P - \Delta P_s \quad (5)$$

Combining Equations 4 and 5:

$$\Delta P_s = \Delta P \left[ \frac{f_1(M_i)}{1+f_1(M_i)} \right] = \Delta P \cdot f_2(M_i) \quad (6)$$

where $$f_2(M_i) = \frac{f_1(M_i)}{1+f_1(M_i)}$$

Dividing Equation 6 by $P_s$:

$$\frac{\Delta P_s}{P_s} = \frac{\Delta P}{P_s} f_2(M_i) \quad (7)$$

The usual subsonic and supersonic expressions for the relationship between Mach number and total and static pressure are:

$$\frac{\Delta P}{P_s} = [1+0.2M^2]^{3.5} - 1 \quad M \leq 1.0 \quad (8)$$

$$\frac{\Delta P}{P_s} = \frac{166.92 M^7}{(7M^2-1)^{2.5}} - 1 \quad M \geq 1.0 \quad (9)$$

It is to be understood in this analysis that whenever the function of the Mach number, $f_3(M)$, is referred to, it implies the combined relationship of Equations 8 and 9. This combined relationship may be expressed simply as:

$$\frac{\Delta P}{P_s} = f_3(M) \quad (10)$$

Substituting Equation 10 in equation 7:

$$\frac{\Delta P_s}{P_s} = f_3(M) \cdot f_2(M_i) \quad (11)$$

The Mach number error, $\Delta M$, may be expressed as either a function of the true Mach number $[\Delta M = f_4(M)]$ or of the indicated Mach number $[\Delta M = f_5(M_i)]$. Thus, since $\Delta M = M - M_i$, $$M = M_i + f_5(M_i) \quad (12)$$

and $$M_i = M - f_4(M) \quad (13)$$

Substituting either Equation 12 or 13 in Equation 11 and simplifying:

$$\frac{\Delta P_s}{P_s} = f_3(M) \cdot f_2[M - f_4(M)] = f_6(M)$$

$$\frac{\Delta P_s}{P_s} = f_3[M_i + f_5(M_i)] \cdot f_2(M_i) = f_7(M_i)$$

and $$\Delta P_s = P_s \cdot f_6(M) = P_s \cdot f_7(M_i) \quad (14)$$

Utilizing the identity of Equation 1 in Equation 14 and simplifying:

$$\Delta P_s = \frac{P_s f_6(M)}{1 - f_6(M)} = P_s f_8(M) \quad (15)$$

$$\Delta P_s = \frac{P_{si} f_7(M_i)}{1 + f_7(M_i)} = P_{si} f_9(M_i) \quad (16)$$

Equations 14, 15 and 16 indicate four solutions for finding the static pressure error utilizing as inputs indicated or true static pressure and indicated or true Mach number.

In the above Equations 14, 15 and 16 the functions of true Mach number, $f_6(M)$ and $f_8(M)$ and the functions of the indicated Mach number $f_7(M_i)$ and $f_9(M_i)$ are merely simplified expressions of combinations of two basic functions, namely $f_1(M_i)$ and $f_3(M)$. Thus, $$f_6(M) = f_3(M) \cdot \frac{f_1(M_i)}{1+f_1(M_i)} \quad (17)$$

and $$f_8(M) = \frac{f_3(M) \cdot f_1(M_i)}{1+f_1(M_i)[1-f_3(M)]} \quad (18)$$

Similar expressions can be obtained for $f_7(M_i)$ and $f_9(M_i)$. As previously discussed, $f_3(M)$ is a combined relationship function of Equations 8 and 9 and is independent of the particular type of aircraft used. The function $f_1(M_i)$, however, does vary with the particular type of aircraft and position of the static pressure ports on the aircraft. A representative curve of the variation of $f_1(M_i)$ with Mach number is shown in FIG. 1. This curve can readily be obtained experimentally.

Figure 2:
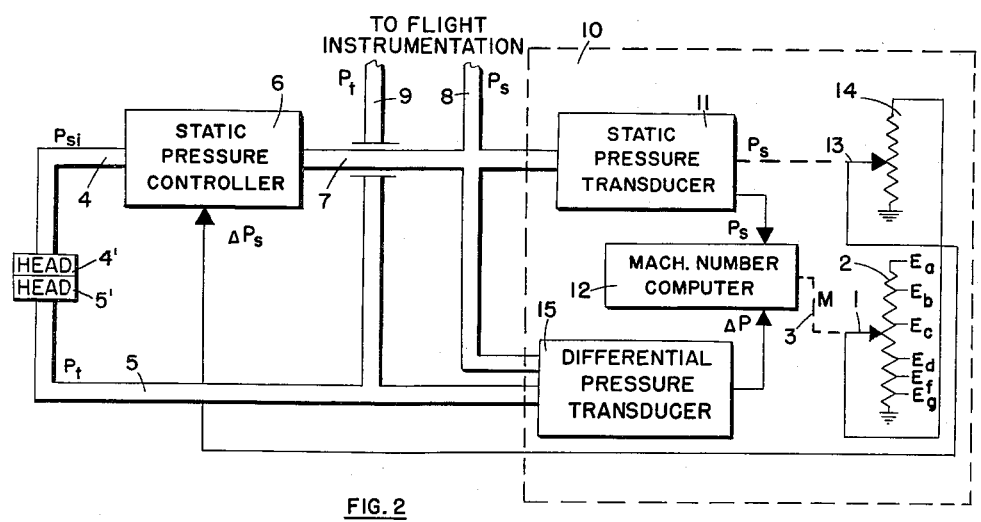
FIG. 2 is a block diagram, partly schematic, of a preferred embodiment of the static pressure error compensator contemplated by this invention.

In the example of FIG. 2, true static pressure, $P_s$, and true Mach number, $M$, are utilized to obtain an electric signal indication of static pressure error, $\Delta P_s$. The conversion of a Mach number indication into a signal indicative of the function $f_6(M)$ is accomplished by utilizing a non-linear wound potentiometer. Referring to FIG. 2, wiper 1 is positioned on potentiometer 2 in response to the shaft rotational output of Mach number computer 12. The angle of rotation of shaft 3 is proportional to the true Mach number of the aircraft. Thus, in FIG. 2, the voltage on wiper 1 of potentiometer 2 is a predetermined function satisfying the above Equation 17 of the rotation of shaft 3 as will be discussed below.

It is to be noted that the slope of this function is not always in the same direction, i.e., the slope is sometimes positive and sometimes negative. The effect of this variation is duplicated by providing a plurality of taps on potentiometer 2. These taps are subjected to a variety of constant D.-C. potentials of preselected magnitudes from sources indicated as $E_a - E_g$. The relative magnitudes of these potentials are selected to give the desired slope to the output signal. Thus, the potential, $E_c$, may be lower than potentials $E_b$ and $E_d$. Therefore, as wiper 1 moves from the tap connected to $E_d$ toward the tap connected to $E_c$, the voltage picked off by wiper 1 decreases, and as wiper 1 moves from the tap connected to $E_c$ toward the tap connected to $E_b$, the potential picked off by the wiper increases. Thus, the polarity of the slope of the voltage between successive taps is determined by the relative magnitudes of the potentials applied to the taps while the magnitude of the slope at any particular point is determined by the magnitude of the volume differential between the adjacent taps and the rate of change of resistivity of the nonlinear potentiometer at that point. Therefore, the output potential on wiper 1, with respect to the input movement caused by shaft 3, is varied in a predetermined manner in accordance with the desired function.

Referring now to FIG. 2, a block diagram, partly schematic, of a preferred embodiment of the static pressure error compensator contemplated by this invention is shown. Pressure tubes 4 and 5 are connected to the conventional pressure ports or heads 4', 5', such as the wing tip pitot static head shown in FIG. 1. Pressure tube 4 is subjected to indicated static pressure $P_{si}$. Pressure tube 5 is subjected to total pressure $P_t$. Static pressure controller 6, to be described later, converts the indicated static pressure in tube 4 to true free-stream static pressure $P_s$ and is in effect a pneumatic summing device which algebraically combines $P_{si}$ with $\Delta P_s$. True free-stream static pressure $P_s$, and total pressure $P_t$ are conveyed to the flight instrumentation such as altimeters air speed indicators and the like (not shown) by tubes 8 and 9, respectively. Static pressure $P_s$ and total pressure $P_t$ are also coupled into static pressure error computer 10 which produces a signal output which is a predetermined function of the static pressure error $\Delta P_s$.

Static pressure transducer 11 in computer 10, converts the input static pressure, $P_s$, into an electric signal which is coupled to Mach number computer 12, and also into a shaft rotation utilized to position wiper 13 on potentiometer 14. Static pressure $P_s$ is also compared to total pressure $P_t$ in differential pressure transducer 15, which produces a signal output which is a predetermined function of the true dynamic pressure differential $\Delta P$. The output signal from transducer 15 is coupled into Mach number computer 12. Mach number computer 12 is made responsive to the signal inputs from transducers 11 and 15, which are predetermined functions of static pressure $P_s$ and true dynamic pressure differential $\Delta P$ and produces a rotational output of shaft 3, which is a function of the true Mach number M of the aircraft. As previously pointed out, a potential picked off by wiper 1 is proportional to the predetermined function $f_6(M)$ of the rotation of shaft 3.

Referring now to Equation 14, the static pressure error, $\Delta P_s$, is equivalent to the product of the true static pressure $P_s$ and the aforementioned function $f_6(M)$. This multiplication is accomplished by connecting wiper 1 to the end tap of linear wound potentiometer 14. Since wiper 13 on potentiometer 14 is positioned in response to static pressure $P_s$, the potential picked off by wiper 13 is proportional to the product of $P_s$ and $f_6(M)$ and therefore is a predetermined function of the static pressure error $\Delta P_s$. This signal is coupled into and controls static pressure controller 6 in a manner to continuously maintain the pressure in tube 7 substantially equivalent to the algebraic sum of indicated static pressure $P_{si}$ and static pressure error $\Delta P_s$. This sum is equivalent to true free-stream static pressure $P_s$.

Figure 4:
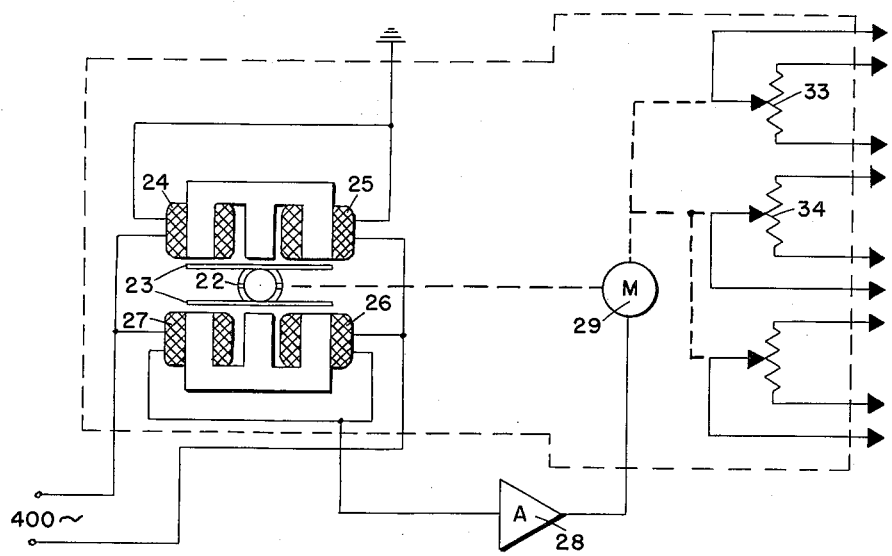
FIG. 4 is a schematic drawing of a typical circuit utilized with the pressure transducer shown in FIG. 3.
Figure 3:
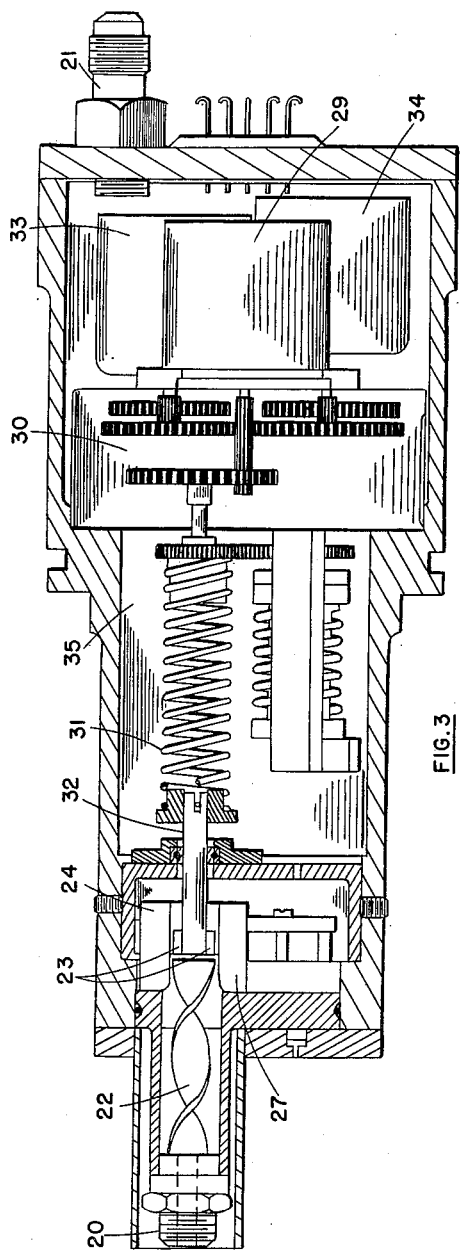
FIG. 3 is a section view of a typical pressure transducer utilized with the static pressure error compensator of FIG. 2.

Static pressure transducer 11 and differential pressure transducer 15 can be constructed similar to the Closed Cycle Pressure Transducer of co-pending patent application filed January 14, 1952, by David G. Soergel and Frederick H. Gardner, Serial No. 266,374, now Patent No. 2,751,576. This closed cycle pressure transducer can be made responsive either to a pressure differential of two pressure inputs or to the absolute pressure of a single input. Referring now to FIGS. 3 and 4 a typical pressure transducer with accompanying circuitry is shown. When used as a pressure differential indicator, one of the sources of pressure is connected to inlet port 20, while the other source of pressure is connected to inlet port 21. Torsional Bourdon tube 22 is thereby subjected internally to the pressure coupled into opening 20 and externally to the pressure coupled into opening 21. If the two pressures are not in balance, the end of Bourdon tube 22 exerts a torque on armatures 23 tending to rotate the armatures about the center line of the tube. An inductive pick-off, utilizing coils 24, 25, 26 and 27, is made sensitive to the rotation of armatures 23 and generates a signal proportional to the angular rotation of the armatures. This signal is amplified by amplifier 28 and drives motor 29, which in turn, is coupled through gear train 30 to torsion spring 31. Torsion spring 31 exerts a torque via shaft 32 on armature 23. This torque is of a direction and magnitude to maintain armatures 23 in a null position.

In addition to motor 29 driving torsion spring 31, the motor also positions, by means of gear train 30, the wipers of a plurality of potentiometers such as potentiometers 33 and 34. The position of the wipers of potentiometers 33 and 34 are, therefore, determined by the pressure differential between the sources connected through openings 20 and 21. Whenever an absolute pressure reading is desired, the inside of Bourdon tube 22 is evacuated, and opening 20 is provided with a seal. The transducer is thereby made sensitive to the pressure coupled into opening 21. The position of the wipers on potentiometers 33 and 34 are then determined by the absolute pressure of the gas in chamber 35.

Figure 5:
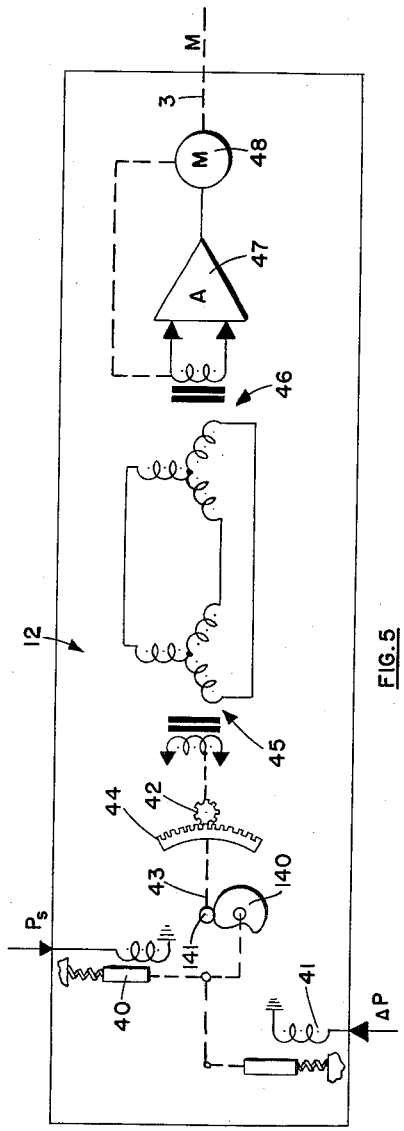
FIG. 5 is a schematic drawing of a typical Mach number computer utilized in the static pressure error compensator of FIG. 2.

Referring now to FIG. 5, a typical Mach number computer 12 for converting electric signal inputs proportional to static pressure $P_s$, and dynamic pressure differential $\Delta P$ into a rotational shaft output proportional to Mach number M as shown. In this computer, signals $P_s$ and $\Delta P$ are utilized to actuate solenoids 40 and 41, respectively. The movement of the plungers of solenoids 40 and 41 in response to the signals impressed on their coils are opposed by appropriately positioned springs. The movement of the plungers of solenoids 40 and 41 results in a rotation of the pinion 42 via linkage 43 and rack 44. Linkage 43 and rack 44 are designed to cause an angular rotation of pinion 42 which is proportional to the Mach number which corresponds with the input static pressure and pressure differential. Cam 140 is rotated in accordance with the output of the linkage driven by the plungers of solenoids 40 and 41. The surface of the cam is cut according to a predetermined Mach number function and effects rotation of rack 44 via cam follower 141.

Attached to and rotating with pinion 42 is the rotor of selsyn generator 45. The stator windings of selsyn generator 45 are connected to the stator windings of selsyn follower 46. Thus, the voltage detected by the rotor windings of selsyn follower 46 is a function of the angular rotation of the rotor of selsyn generator 45. This voltage is amplified by amplifier 47, which in turn is connected to actuate motor 48. Motor 48 is provided with a mechanical feed-back to selsyn follower 46, which positions the rotor of follower 46 in its null signal position. Simultaneously, motor 48 provides a rotational output of shaft 3 which is utilized in a static error computer of FIG. 2 to position wiper 1 on potentiometer 2.

Figure 6:
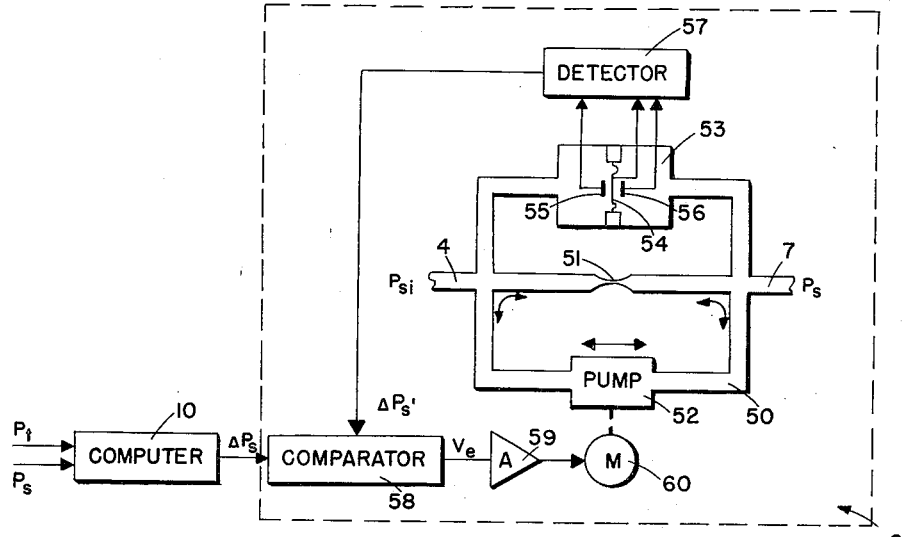
FIG. 6 is a schematic drawing of a preferred static pressure controller utilized with the static pressure error compensator of FIG. 2.

Referring now to FIG. 6, a schematic drawing of a preferred static pressure controller utilized with the static pressure error compensator of FIG. 2 is shown. This static pressure controller is similar to that described in the co-pending patent application Serial No. 512,239, entitled, Static Pressure Compensator, filed by William D. Mullins, Jr., on May 31, 1955. Static pressure controller 6 utilizes a closed ring 50 connected in series with static pressure tubes 4 and 7. Closed ring conduit 50 includes restrictive orifice 51 and bi-directional pump or blower 52. The direction and pumping rate of pump 52 is made adjustable. Pump 52 continuously recirculates air about closed ring conduit 50. As a result, there is a pressure drop of predetermined magnitude across restrictive orifice 51. The magnitude and direction of this pressure drop is determined by the pumping rate and direction of pumping, respectively, of pump 52.

Utilizing this circuit, a pressure differential of predetermined magnitude can be created and maintained between pressure tubes 4 and 7. The instantaneous pressure differential between static pressure tubes 4 and 7 is detected by capacitive pick-off 53. Pick-off 53 consists of a flexible diaphragm of conductive material 54 having stationary plates 55 and 56 positioned on either side of diaphragm 54. Movement of the diaphragm varies the relative capacitance between the diaphragm and the respective stationary plates. This variation in relative capacitance is detected by bridge detector 57, which generates a signal output proportionally to the instantaneous pressure differential $\Delta P_s'$, between pressure tubes 4 and 7.

This output signal from detector 57 is compared in comparator 58 with the previously described static pressure error signal, $\Delta P_s$, from static pressure error computer 10. Comparator 58 produces an output voltage $V_e$, which is a function of the relative magnitudes of the two inputs, $\Delta P_s$ and $\Delta P_s'$. This voltage is amplified by amplifier 59. The output of amplifier 59 is connected to actuate motor 60. The actuation of motor 60 drives pump 52 in a direction and at an angular velocity sufficient to produce a pressure differential across orifice 51, which is equivalent to the static pressure error, $\Delta P_s$, computed by computer 10. Thus, the pressure controller 6 is a summing device or comparator which generates a differential static pressure (in accordance with the error signal from the computer 10) which is algebraically additive to the static pressure in line 4.

Figure 7:
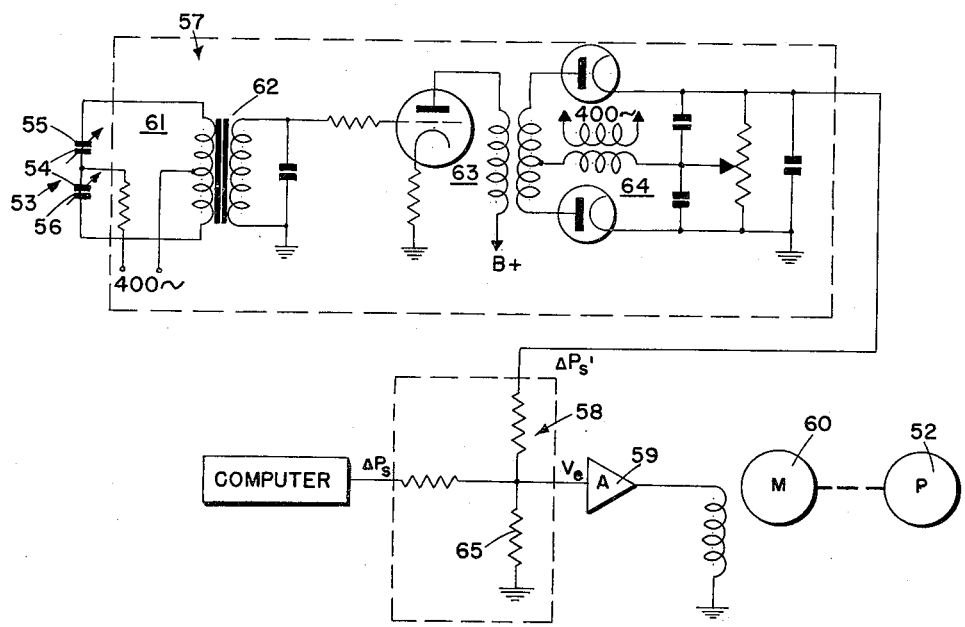
FIG. 7 is a schematic drawing of an electronic circuit utilized with the static pressure controller of FIG. 6.

Referring now to FIG. 7, a schematic drawing of an electronic circuit utilized with static pressure controller 6 of FIG. 6 is shown. The unbalancing of capacitor pick-off 53 unbalances bridge 61 producing a signal output across the secondary winding of transformer 62, the polarity of which is determined by the direction of movement of diaphragm 54 and the magnitude which is determined by the magnitude of deflection of diaphragm 54. This signal is amplified by amplifier 63 and converted to a D.-C. potential by phase detector 64. The direction and magnitude of this D.-C. potential is determined by the direction and magnitude of movement of diaphragm 54. This D.-C. potential output, $\Delta P_s'$, is compared with the signal output from computer 10 in comparator 58, which is essentially a summing network producing a voltage across resistor 65, which is proportional to the algebraic sum of the two input signals. The voltage $V_e$, produced across resistor 65, is amplified by amplifier 59 and connected to actuate motor 60. Motor 60 is therefore continuously rotating at an angular velocity which is proportional to the computed static pressure error $\Delta P_s$.

Figure 8:
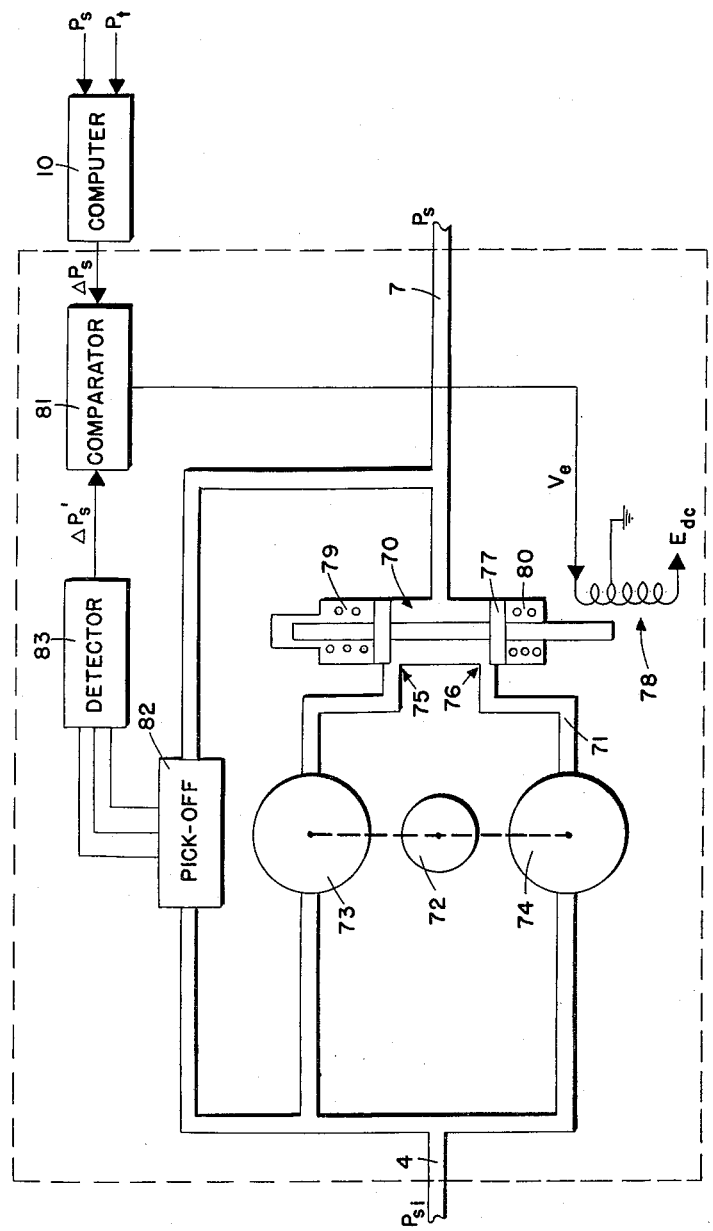
FIG. 8 is an alternative static pressure controller utilized with the static pressure error compensator of FIG. 2.

Referring now to FIG. 8, an alternative static pressure controller or differential pressure generator utilized with a static pressure error compensator of FIG. 2 is shown. In this embodiment, instead of using variable speed pump 52 to control the pressure differential between pressure tubes 4 and 7, an adjustable valve 70 is provided in closed ring conduit 71. Constant speed motor 72 continuously drives blowers 73 and 74 which are connected to aid one another in continuously recirculating air around ring conduit 71. As long as orifices 75 and 76 have the same resistance to the flow of the recirculating air, there is zero pressure differential between pressure tubes 4 and 7. Movement of piston 77, in response to solenoid 78, changes the relative resistance to flow of orifices 75 and 76. There results a pressure differential between pressure tubes 4 and 7. The magnitude and direction of this pressure differential are determined by the magnitude and direction of movement of piston 77. Piston 77 is normally held in a null position by the actions of springs 79 and 80, and the D.-C. bias applied to solenoid 78. A signal $V_e$ from comparator 81 unbalances this condition of equilibrium resulting in a movement of piston 77 in a direction determined by the polarity of voltage $V_e$, and in an amount which is determined by the magnitude of voltage $V_e$. Pick-off 82, detector 83, and comparator 81, are constructed similar to pick-off 53, detector 57, and comparator 58, previously described with respect to FIG. 6. The valve, pumps and motor of FIG. 8 thus comprise a pneumatic summing device which algebraically adds a pressure differential or increment, in accordance with the error signal from computer 10, to the static pressure in line 4.

Referring now to FIG. 9, a schematic drawing of an alternative embodiment of the static pressure error compensator contemplated by this invention is shown. In this embodiment the indicated static pressure, $P_{si}$, is converted into an electric signal indication properly compensated for the static pressure error $\Delta P_s$. This signal is coupled to the aircraft instrumentation (not shown). Differential pressure transducer 90 and pressure transducer 91 are similar to the closed cycle pressure transducer previously described with respect to FIGS. 3 and 4. The armature of pick-off 92 of transducer 90 is subjected to a torque from the torsional Bourdon tube proportional to the indicated dynamic pressure differential $\Delta P_i$. The output of the bridge network of the coils of pick-off 92 is coupled to summing network 93, which also has an input, a signal proportional to a static pressure error $\Delta P_s$ from circuitry to be described later. From Equation 5 $\Delta P$ is equal to the algebraic sum of $\Delta P_i$ and $\Delta P_s$, therefore, the signal impressed across resistor 118 is proportional to the true dynamic pressure differential $\Delta P$. This amplified signal is connected to actuate servo motor 95 which, in addition to producing a counter torque proportional to $\Delta P$ on the armature pick-off 92, positions wipers 96 and 97 of potentiometers 98 and 99, respectively.

The armature of pick-off 100 of transducer 91 is subjected to a torque from the torsional Bourdon tube proportional to the absolute indicated static pressure $P_{si}$. The signal output proportional to $P_{si}$ from the bridge network of pick-off 100 is coupled to summing network 101. Summing network 101 also has as an input a signal proportional to a negative static pressure error, $-\Delta P_s$. From Equation 1 $P_s$ is equal to the algebraic sum of $P_{si}$ and $-\Delta P_s$. Therefore, the signal impressed across resistor 119 is proportional to the true static pressure, $P_s$. Servo amplifier 102 is thus subjected to a signal proportional to the absolute true free-stream static pressure $P_s$. The amplified output of amplifier 102 is coupled to actuate servo motor 103, which in addition to producing a counter torque proportional to $P_s$ on the armature of pick-off 100, controls the position of wipers 104, 105 and 106 of potentiometers 107, 108 and 109, respectively.

A signal proportional to the static pressure error $\Delta P_s$ is generated utilizing non-linear wound potentiometers 110 and 108. Wiper 111 of potentiometer 110 is positioned in response to the Mach number of the aircraft. In this circuit a shaft rotation proportional to Mach number is obtained by utilizing a normally balanced bridge network 112 having resistor 113, and potentiometers 98, 107 and 114 in the arms. Bridge network 112 is subjected to a D.-C. reference voltage from a source (not shown). Amplifier 115 is sensitive to the unbalancing of bridge 112 by a change in either the true dynamic pressure differential, $\Delta P$, as indicated by the setting of potentiometer 98 of transducer 90 or the true static pressure, $P_s$, as indicated by the setting of potentiometer 107 of transducer 91. A servo loop including amplifier 115, motor 116, and non-linear potentiometer 114 is utilized to rebalance the bridge. The rotational output of motor 116 which is a function of the Mach number is also utilized to position wiper 111 on potentiometer 110.

As previously noted, wiper 105 of potentiometer 108 is positioned in response to absolute true free-stream static pressure $P_s$. Potentiometer 110 is non-linearly wound and subjected to a plurality of graduating potentials in a manner similar to that previously described with respect to potentiometer 2 of FIG. 2. As a result, the potential of wiper 105 of potentiometer 108 is a predetermined function of the static pressure error $\Delta P_s$. This signal is impressed across the primary winding of transformer 117, the secondary winding of transformer 117 is connected to summing networks 93 and 101.

From the foregoing it is readily apparent that the wipers of potentiometers 98 and 99 are positioned as a function of the true dynamic pressure differential, $\Delta P$, and that the wipers of potentiometers 107, 108 and 109 are positioned as a function of the true free-stream static pressure, $P_s$. Since potentiometer 109 is subjected to a constant voltage $E_r$ from a source (not shown), the potential of wiper 106 is a predetermined function of the true static pressure, $P_s$. This potential is coupled to the aircraft instrumentation (not shown) which utilizes a static pressure input.

It will be seen that in each embodiment there is produced, either pneumatically or electrically, a signal indicative of indicated static pressure which signal is to be transferred in some form, such as pneumatic or electrical, to the aircraft instruments after it has been suitably compensated for static pressure error. To this end a correction or pressure differential generating device is operatively coupled between the indicated static pressure signal and the output. This correction or pressure differential generating device may be the controller 6 of FIGS. 2, 6 or 8 or the summing network or comparator 101 of FIG. 9.

Although the aforementioned example of the preferred embodiments of the pressure compensator contemplated by this invention utilized either indicated or true static pressure and indicated or true Mach number to obtain a signal proportional to the static pressure error, it is readily apparent from a consideration of the Equations 1 through 18 that the static pressure error signal can be found by utilizing functions of the total pressure or indicated or true dynamic pressure differential and indicated or true Mach number.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A static pressure error compensator comprising static and total pressure heads adapted to be carried by an aircraft, means coupled with said heads for deriving indicated static pressure and total pressure signals respectively indicative of indicated static pressure and total pressure at said heads, computer means for deriving an error signal indicative of the static pressure error of said pressures, and comparator means for algebraically combining said indicated static pressure signal with said error signal to produce a corrected signal indicative of true free-stream static pressure, said computer means comprising means responsive to said total pressure signal and said corrected signal for generating a Mach number signal which is a predetermined function of the Mach number of said aircraft, and means for generating said error signal as a function of the product of said Mach number signal and said corrected signal.

2. A static pressure error compensator comprising a first transducer responsive to total and indicated static pressures in the vicinity of an aircraft for generating a $\Delta P_i$ signal indicative of the difference between said pressures, a second transducer responsive to indicated static pressure for generating a $P_{si}$ signal indicative of said indicated static pressure, a first summing means having as inputs thereto said $\Delta P_i$ signal and a $\Delta P_s$ signal for producing a $\Delta P$ signal indicative of the algebraic sum of said inputs, a second summing means having as inputs thereto said $P_{si}$ signal and said $\Delta P_s$ signal for producing as the algebraic sum of its inputs a $P_s$ signal indicative of true free-stream static pressure, Mach number computing means responsive to said $\Delta P$ and $P_s$ signals for generating an M signal indicative of a predetermined function of the Mach number of said aircraft, means for multiplying said M signal by said $P_s$ signal to produce said $\Delta P_s$ signal indicative of static pressure error, and means for feeding predetermined functions of said $\Delta P_s$ signal as inputs to said first and second summing means 3. A static pressure error compensator for producing an accurate indication of the true free-stream static pressure externally of a high-speed aircraft comprising first and second means adapted to be connected respectively with sources of external static and total pressure for producing first and second signals respectively indicative of static and total pressure, means for producing a static pressure error signal, and summing means for algebraically combining said error signal with said first signal indicative of static pressure to provide as its output said accurate indication, said error signal producing means comprising computer means responsive to the output of said summing means and to said second signal for computing the Mach number of said aircraft and generating said error signal in accordance with said second signal, said Mach number and the output of said summing means.

4. Pressure indicating apparatus for producing an accurate output indication of the true free-stream static pressure externally of a high-speed aircraft comprising total and static pressure heads attached to said aircraft and positioned to be subjected respectively to total air pressure and indicated static air pressure, computer means having a first input responsively coupled with said total pressure head and having a second input responsive to said output indication of said apparatus for generating an error signal indicative of the static pressure error of said static pressure head, means coupled with said static head for producing a signal indicative of said indicated static air pressure, and algebraic summing means having inputs respectively coupled with said indicated static air pressure signal producing means and said computer means for algebraically combining said indicated static air pressure signal with said error signal to provide said second input of said computer means and said output indication of said apparatus.

5. Pressure indicating apparatus for producing a true static pressure signal indicative of the true free-stream static pressure externally of a high-speed aircraft comprising pressure sensitive means attached to said aircraft and positioned to produce a total pressure signal indicative of the total air pressure in the direction of flight of said aircraft; pressure sensitive means attached to said aircraft and positioned to produce an indicated static pressure signal indicative of the indicated static air pressure at some preselected point with reference to said aircraft; computer means having a first input responsive to said true static pressure signal and having a second input coupled with said first named pressure sensitive means for generating an error signal indicative of the static pressure error of said second named pressure sensitive means; and summing means having inputs respectively connected with said computer and said second named pressure sensitive means for algebraically adding said error signal to said indicated static pressure signal to produce as its output said true static pressure signal, said summing means output being coupled to said first input of said computer means.

6. Pressure indicating apparatus for an aircraft comprising pressure heads positioned to be subjected to total air pressure and indicated static air pressure, a pressure differential transducer responsive to said total pressure and indicated static pressure from said pressure heads and connected to produce a differential pressure signal which is a predetermined function of the differential between said pressures, first algebraic summing means connected to receive said differential pressure signal as one input thereto, a pressure transducer responsive to said indicated static air pressure from said pressure heads for producing an indicated static pressure signal, second algebraic summing means connected to receive said indicated static pressure signal as one input thereto, each summing means having a second input and having an output indicative of the sum of its inputs, Mach number computer means responsive to the outputs of said first and second summing means for producing a Mach signal which is a predetermined function of the Mach number of said aircraft, static pressure error computer means for multiplying the output of said second summing means with said Mach signal to provide an error signal which is a predetermined function of the static pressure error of said pressure heads, and means for feeding a predetermined function of said error signal to each of said summing means as the second input thereof.

7. Pressure indicating apparatus adapted to continuously convert indicated static pressure into true free-stream static pressure externally of an aircraft comprising a pressure head positioned to be continuously subjected to the total air pressure of said aircraft in the direction of movement of said aircraft; a pressure head positioned to be continuously subjected to the static air pressure at a predetermined point relative to said aircraft; a pressure transducer responsive to true free-stream static pressure and having a signal output which is a predetermined function of said true free-stream static pressure and having an output connected to position a wiper on a first potentiometer in response to said true free-stream static pressure; a pressure differential transducer responsive to said total pressure and said true free-stream static pressure and having a signal output which is a predetermined function of the pressure differential between said pressures; a Mach computer subjected to said signals from said pressure transducer and said pressure differential transducer and having an output connected to position a wiper on a second potentiometer in response to the Mach number corresponding to said signals, means for energizing said first potentiometer from the wiper of said second potentiometer; and a controller including means for generating a pressure increment in accordance with an error signal, said controller being subjected to the indicated static pressure derived from said second named pressure head and including means for algebraically combining said pressure increment with said indicated static pressure to produce true free-stream static pressure, means coupled with the wiper of said first potentiometer for supplying said error signal to said pressure generating means, and means for coupling said pressure generating means with each of said transducers.

8. A static pressure compensating arrangement for an aircraft comprising first and second means respectively connected with external pressure sources of static and total pressures for producing signals respectively indicative of static and total pressure of said sources; output means for communicating a compensated static pressure signal to static instruments in said aircraft; correction generating means operatively connected between said output means and said static pressure signal producing means for generating a correction signal (in accordance with an error signal) algebraically additive to the said static pressure signal to provide said compensated static pressure signal in said output means; computer means responsively connected to said output means and said total pressure signal producing means for generating a static pressure error signal output in accordance with varying parameters effecting static pressure error as encountered in flight of said aircraft; said correction generating means being responsively coupled with said static pressure error signal output of said computer means to provide a corresponding error control signal to said correction generating means, said error control signal being arranged to control the action of said correction generating means, whereby a controllable compensating static pressure signal comparable to the free-stream static pressure is produced at said output means.

9. A static pressure compensating arrangement for an aircraft comprising a first pneumatic line connected to an external static pressure source; a second pneumatic line for communicating compensated static pressure to static instruments in the aircraft; pressure generating means operative between said first and second pneumatic lines for generating a differential static pressure (in accordance with an error signal) algebraically additive to the source static pressure from said first pneumatic line to provide a resultant static pressure output in the said second line; computer means for generating a static pressure error signal output in accordance with varying parameters effecting static pressure error as encountered in flight of the said aircraft; and amplifier means connected with said pressure generating means and responsive to said signal output to provide a corresponding error control signal, said error control signal being arranged to control the generating action of said pressure generating means, whereby a controllable compensating static pressure is produced at said second pneumatic line to provide an output static pressure comparable to the free-stream static pressure.

10. A static pressure compensating arrangement for an aircraft comprising input means connected with an external pressure source of static pressure for producing a signal indicative of indicated static pressure of said source; output means for communicating a compensated static pressure signal to instruments in said aircraft; correction generating means operatively connected between said output means and said static pressure signal producing means for generating a correction signal (in accordance with an error signal) algebraically additive to the said static pressure signal to provide said compensated static pressure signal in said output means; computer means for generating a static pressure error signal output in accordance with varying parameters effecting static pressure error as encountered in flight of said aircraft, said computer means including means responsive to static pressure of said source and to total pressure external to said aircraft for generating said error signal as a function of Mach number of said aircraft; and means connected with said correction generating means and responsive to said static pressure error signal output of said computer means to provide a corresponding error control signal, said error control signal being arranged to control the action of said correction generating means, whereby a controllable compensated static pressure signal comparable to the free-stream static pressure is produced at said output means.

References Cited in the file of this patent

UNITED STATES PATENTS

| | | |
|---|---|---|
| 2,457,287 | Townes | Dec. 28, 1948 |
| 2,512,790 | Cleveland | July 27, 1950 |
| 2,694,927 | Coulbourn et al. | Nov. 23, 1954 |
| 2,806,353 | Grafinger et al. | Sept. 17, 1957 |